(12) United States Patent
Zhang et al.

(10) Patent No.: US 9,307,207 B2
(45) Date of Patent: Apr. 5, 2016

(54) GLARING REDUCTION FOR DYNAMIC REARVIEW MIRROR

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Kent S. Lybecker, Rochester, MI (US); Jeffrey S. Piasecki, Rochester, MI (US); Ryan M. Frakes, Bloomfield Hills, MI (US); Travis S. Hester, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 14/040,952

(22) Filed: Sep. 30, 2013

(65) Prior Publication Data

US 2014/0192227 A1     Jul. 10, 2014

Related U.S. Application Data

(60) Provisional application No. 61/749,783, filed on Jan. 7, 2013.

(51) Int. Cl.
| | | |
|---|---|---|
| *H04N 5/225* | (2006.01) | |
| *H04N 5/228* | (2006.01) | |
| *H04N 5/235* | (2006.01) | |
| *G06K 9/40* | (2006.01) | |
| *G06K 9/36* | (2006.01) | |
| *H04N 9/04* | (2006.01) | |

(52) U.S. Cl.
CPC ............. *H04N 9/045* (2013.01); *H04N 5/2355* (2013.01)

(58) Field of Classification Search
CPC ... H04N 5/23232; H04N 5/247; H04N 5/235; H04N 5/2355; H04N 5/378; H04N 5/359
USPC .......... 348/218.1, 230.1, 222.1; 382/274–284
See application file for complete search history.

(56) References Cited

U.S. PATENT DOCUMENTS

| | | | |
|---|---|---|---|
| 8,237,850 B2 * | 8/2012 | Tsujino | H04N 5/23212 348/222.1 |
| 8,295,641 B2 * | 10/2012 | Ishigami et al. | 382/278 |

(Continued)

OTHER PUBLICATIONS

U.S. Appl. No. 13/835,741, filed Mar. 15, 2013.

(Continued)

*Primary Examiner* — Chia-Wei A Chen

(57) ABSTRACT

A method for generating a glare-reduced image from images captured by a camera device of a subject vehicle includes obtaining a short-exposure image and a long-exposure image and generating a resulting high dynamic range image based on the short-exposure and long-exposure images. Pixel values are monitored within both the short- and long-exposure images. A light source region is identified within both the short- and long-exposure images based on the monitored pixel values. A glaring region is identified based on the identified light source region and one of calculated pixel ratios and calculated pixel differences between the monitored pixel values of the long- and short-exposure images. The identified glaring region upon the resulting high dynamic range image is modified with the identified light source region within the short-exposure image. The glare-reduced image is generated based on the modified identified glaring region upon the resulting HDR image.

20 Claims, 4 Drawing Sheets

(56) References Cited

U.S. PATENT DOCUMENTS

| | | | |
|---|---|---|---|
| 8,699,821 B2* | 4/2014 | Orr et al. | 382/294 |
| 2003/0184671 A1* | 10/2003 | Robins et al. | 348/362 |
| 2008/0219585 A1* | 9/2008 | Kasai et al. | 382/274 |
| 2009/0066819 A1* | 3/2009 | Ando | 348/254 |
| 2009/0147116 A1* | 6/2009 | Koyama et al. | 348/294 |
| 2009/0174792 A1* | 7/2009 | Kusaka et al. | 348/230.1 |
| 2009/0231445 A1* | 9/2009 | Kanehiro | 348/208.2 |
| 2010/0172542 A1* | 7/2010 | Stein et al. | 382/103 |
| 2010/0295932 A1* | 11/2010 | Yokomachi et al. | 348/79 |
| 2011/0050965 A1* | 3/2011 | Uzumaki | 348/241 |
| 2011/0069205 A1* | 3/2011 | Kasai et al. | 348/239 |
| 2011/0085064 A1* | 4/2011 | Nishide | 348/294 |
| 2011/0150357 A1* | 6/2011 | Prentice | 382/274 |
| 2011/0157362 A1* | 6/2011 | Krokel | 348/148 |
| 2011/0204206 A1* | 8/2011 | Taoka | 250/208.1 |
| 2011/0211732 A1* | 9/2011 | Rapaport | 382/107 |
| 2012/0105639 A1* | 5/2012 | Stein | H04N 5/235 348/148 |
| 2012/0233841 A1* | 9/2012 | Stein | 29/428 |
| 2012/0300074 A1* | 11/2012 | Hasegawa | 348/148 |
| 2012/0314103 A1* | 12/2012 | Majewicz et al. | 348/239 |
| 2013/0016245 A1* | 1/2013 | Yuba | 348/222.1 |
| 2013/0051700 A1* | 2/2013 | Jo | H04N 5/23254 382/284 |
| 2013/0113965 A1* | 5/2013 | Takahashi et al. | 348/294 |
| 2013/0215290 A1* | 8/2013 | Solhusvik et al. | 348/231.99 |
| 2013/0223739 A1* | 8/2013 | Tay et al. | 382/170 |
| 2013/0243283 A1* | 9/2013 | Kotchou et al. | 382/128 |
| 2014/0016020 A1* | 1/2014 | Ohbuchi et al. | 348/353 |
| 2014/0153839 A1* | 6/2014 | Tsuzuki | 382/254 |
| 2014/0177913 A1* | 6/2014 | Holz | 382/103 |
| 2014/0184894 A1* | 7/2014 | Motta | 348/362 |
| 2014/0321766 A1* | 10/2014 | Jo | 382/255 |
| 2015/0022703 A1* | 1/2015 | Oike | 348/308 |
| 2015/0029354 A1* | 1/2015 | Yang et al. | 348/222.1 |

OTHER PUBLICATIONS

U.S. Appl. No. 13/962,156, filed Aug. 8, 2013.

* cited by examiner

GLARING REDUCTION FOR DYNAMIC REARVIEW MIRROR

CROSS REFERENCE TO RELATED APPLICATIONS

This application claims the benefit of U.S. Provisional Application No. 61/749,783, filed on Jan. 7, 2013, which is incorporated herein by reference.

TECHNICAL FIELD

This disclosure is related to reducing glaring effects in captured images from direct and reflected illumination sources.

BACKGROUND

The statements in this section merely provide background information related to the present disclosure. Accordingly, such statements are not intended to constitute an admission of prior art.

Vehicle systems may use in-vehicle vision systems for rear-view scene detection, side-view scene detection, and forward view scene detection. Glaring effects in images captured by in-vehicle vision systems may be present through direct illumination sources and through reflection. Direct illumination sources can include headlights and reflection can be from a road surface, traffic infrastructure signs, or other structures within view of the in-vehicle vision systems.

It is known to make hardware implementations to a camera device to reduce image glare. For instance, polarization may be applied to a lens and/or cover glass of the camera device. However, glaring may only be reduced in one plane when applying polarization, and hence, may only be suitable for reducing glaring resulting from reflection from a road surface, but not from vertical buildings, and vice-versa. Additionally or alternatively, tinting may be applied to the lens and/or cover glass of the camera device; however, while glaring may be reduced, color information and/or image sensitivity is undesirably reduced in the captured image.

SUMMARY

A method for generating a glare-reduced image from images captured by a camera device of a subject vehicle includes obtaining a short-exposure image and a long-exposure image and generating a resulting high dynamic range image based on the short-exposure and long-exposure images. Pixel values are monitored within both the short- and long-exposure images. A light source region is identified within both the short- and long-exposure images based on the monitored pixel values. A glaring region is identified based on the identified light source region and one of calculated pixel ratios and calculated pixel differences between the monitored pixel values of the long- and short-exposure images. The identified glaring region upon the resulting high dynamic range image is modified with the identified light source region within the short-exposure image. The glare-reduced image is generated based on the modified identified glaring region upon the resulting HDR image.

BRIEF DESCRIPTION OF THE DRAWINGS

One or more embodiments will now be described, by way of example, with reference to the accompanying drawings, in which.

DETAILED DESCRIPTION

Figure 1:
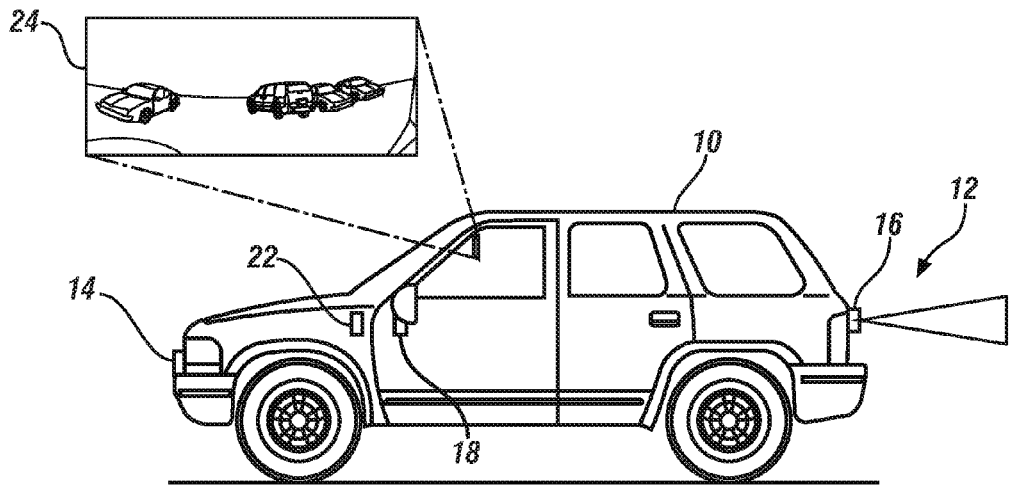
FIG. 1 illustrates a subject vehicle including a surround view vision-based imaging system, in accordance with the present disclosure.

Referring now to the drawings, wherein the showings are for the purpose of illustrating certain exemplary embodiments only and not for the purpose of limiting the same, FIG. 1 illustrates a subject vehicle (vehicle) 10 including a surround view vision-based imaging system 12, in accordance with the present disclosure. The vehicle is traveling along a road and the vision-based imaging system 12 captures images of the road. The vision-based imaging system 12 captures images surrounding the vehicle based on the location of one or more vision-based camera devices. In the embodiments described herein, the vision-based imaging system will be described as capturing images rearward of the vehicle; however, it should also be understood that the vision-based imaging system 12 can be extended to capturing images forward of the vehicle and to the sides of the vehicle.

The vision-based imaging system 12 can include any combination of a front-view camera device 14 for capturing a field of view (FOV) forward of the vehicle 10, a rear-view camera device 16 for capturing a FOV rearward of the vehicle 10, a left-side view camera device 18 for capturing a FOV to a left side of the vehicle 10, and a right-side view camera for capturing a FOV on a right side of the vehicle 10. The cameras 14-18 can be any camera suitable for the embodiments described herein, many of which are known in the automotive art, that are capable of receiving light, or other radiation, and converting the light energy to electrical signals in a pixel format using, for example, one of charged coupled device (CCD) sensors or complimentary metal-oxide-semiconductor (CMOS) sensors. The cameras 14-18 generate frames of image data at a certain data frame rate that can be stored for subsequent processing. The cameras 14-18 can be mounted within or on any suitable structure that is part of the vehicle, such as bumpers, spoilers, trunk lids, fascia, grill, side-view mirrors, door panels, etc., as would be well understood and appreciated by those skilled in the art. Image data from the cameras 14-18 is sent to a processor 22, i.e., a non-transitory processing device, that processes the image data to generate images that can be displayed on a rearview mirror display device 24.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
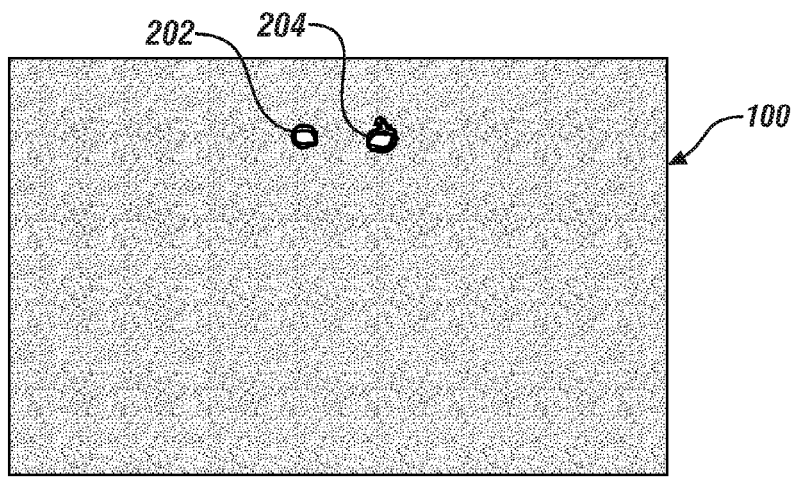
FIG. 2 illustrates a short-exposure image captured from a rear-view camera device of FIG. 1 representing a field of view rearward of the vehicle, in accordance with the present disclosure.
Figure 3:
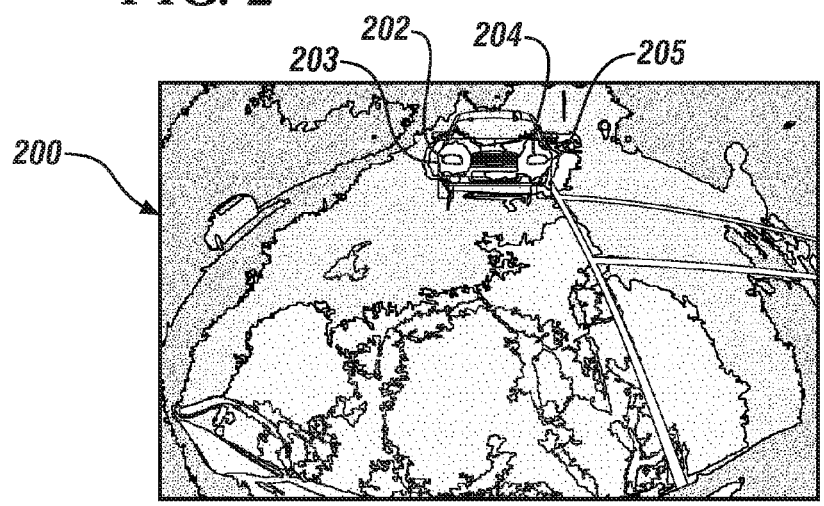
FIG. 3 illustrates a long-exposure image captured from the rear-view camera device of FIG. 1 representing a field of view rearward of the vehicle, in accordance with the present disclosure.
Figure 4:
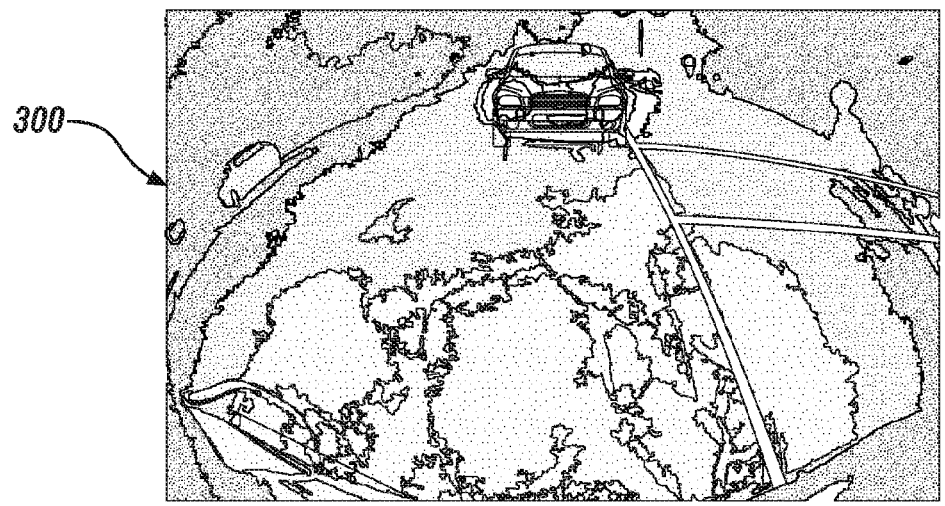
FIG. 4 illustrates a non-limiting exemplary glare-reduced image where an identified region having a glaring effect from headlights is modified with a short-exposure region, in accordance with the present disclosure.

FIGS. 2-4 illustrate exemplary images 100, 200, 300 captured by the rear-view camera device 16 of FIG. 1 representing a field of view (FOV) rearward of the vehicle 10, in accordance with the present disclosure. In a non-limiting exemplary embodiment, the rear-view camera device 16 is configured to capture a 180° FOV rearward of the vehicle with a downward pitch. The camera device is capable of capturing both short-exposure and long-exposure image data. Image data from the camera device 16 can be processed by the processor 22 of FIG. 1 to generate an image that can be displayed on any suitable vehicle display units including the rearview mirror display device 24 of FIG. 1. In one embodiment, the rearview mirror display device is integrated within a human machine interface (HMI) of the vehicle. In another embodiment, the rearview display device is integrated with a rearview mirror mounted within the interior of the vehicle. While the embodiments described herein refer to the rear-view camera device 16 configured to capture the FOV rearward of the vehicle, it will be understood that the embodiments herein can be similarly applied to camera devices capturing images presenting a FOV forward of the vehicle and/or to the sides of the vehicle.

Referring to FIG. 2, a short-exposure image 100 captured from the camera device 16 is illustrated. The short-exposure image 100 has poor optimal image quality during low-light or night-time driving conditions. However, light sources 202 and 204 from headlights of a traveling vehicle are present without any significant glaring effect in the short-exposure image.

Referring to FIG. 3, a long-exposure image 200 captured from the camera device 16 is illustrated. The long-exposure image 200 represents the same scene as the exemplary short-exposure image 100 of FIG. 2. The long-exposure image 200 has enhanced optimal image quality during low-light or night-time driving conditions due to the longer-exposure time allowing for more light to enter an imaging chip of the camera device 16. However, the light sources 202 and 204 from the headlights of the traveling vehicle generate too much light upon the imaging chip, which produces glaring effects 203 and 205 in the long-exposure image 200.

FIG. 4 illustrates a non-limiting exemplary glare-reduced image 300 where an identified region having a glaring effect from headlights upon a resulting high dynamic range (HDR) image is replaced with a short-exposure region. It will be appreciated that the generated HDR image is based on the obtained short-exposure and long-exposure images. In the illustrated example, regions of the glare-reduced image 300 where the glaring effects are present in the long-exposure image 200 of FIG. 3 are identified and replaced by short-exposure regions corresponding to the to the regions where the light sources, e.g., headlights 202 and 204, are identified from the short-exposure image 100 of FIG. 2. While the illustrated non-limiting embodiment of FIG. 4 replaces the identified glaring effects with the short-exposure image, embodiments herein in are directed toward modifying the identified glaring effects with the identified light source region within the short-exposure image. For instance, the resulting HDR image may include an equal portion of each the obtained long-exposure and short-exposure images. The identified glaring effect may be modified by increasing the portion of the identified light source region within the short-exposure image and decreasing the portion of the identified light source region within the long-exposure image applied thereto.

Exemplary embodiments are directed toward generating a glare reduced image. Generating the glare-reduced image can be executed by the processor 22 of FIG. 1, wherein light source regions within both short- and long-exposure images must first be identified. The processor 22 can identify the light source regions as saturated regions where detection of high intensity values (i.e., light) are indicative of potential saturation. Thereafter, in one embodiment, the processor 22 can calculate pixel ratios between the monitored pixel values of the long-exposure image and the short-exposure image to identify a glaring region. In another embodiment, the processor 22 can calculate pixel differences between the monitored pixel values of the long-exposure image and the short-exposure image to identify the glaring region. In one embodiment, the term "pixel value" refers to at least an intensity value for each pixel within both the short-exposure and the long-exposure images. In another embodiment, the term "pixel value" additionally refers to color information for each pixel within both the short-exposure and the long-exposure images. Regions indicative of a glaring effect are detected by the processor 22 when the pixel ratios (or pixel differences) around a perimeter of the identified light source within both the short- and long-exposure images are large. In one embodiment, when the pixel ratios exceed a glaring threshold, a region indicative of the glaring effect is present. In another embodiment, when the pixel differences exceed a glaring threshold a region indicative of the glaring effect is present. It will be appreciated that the glaring threshold with respect to the pixel differences is a different value than the glaring threshold with respect to the pixel ratios. Hereinafter, this disclosure will describe identifying the glaring region based on the calculated pixel ratios; however, it will be understood that the glaring region can be similarly identified based on the calculated pixel differences. Accordingly, these regions where the glaring effect is present can be referred to as "glaring regions" around the perimeters of the light sources. Lastly, the identified glaring regions indicative of the glaring effect are modified, using the processor 22, with the short-exposure regions corresponding to the identified light source regions in the short-exposure image. Hence, the glare-reduced image (e.g., glare reduced image 300 of FIG. 4) includes the regions having the glaring effect modified by the short-exposure regions upon the resulting HDR image to reduce glare in all other regions for optimal (i.e. enhanced) image quality.

The camera device 16 utilizes a color-sensitive imaging chip having an integrated circuit of an array of pixel sensors each including a photodetector and an active amplifier. In one embodiment, the imaging chip is a complementary metal-oxide-semiconductor (CMOS) sensor. In another embodiment, the imaging chip is a charge-coupled device (CCD) sensor and is mounted to a camera board of the camera device. Both CCD and CMOS sensors function by employing photosensitive circuitry that reacts to light and coverting the light into electrical charge. An analogue-digital circuit within the sensors can convert an analogue signal (e.g., voltage or current) from a photovoltaic charge to digital data, e.g., the captured image.

A CCD sensor is a photosensitive analog device that records light as a small electrical charge in each of its pixels or cells. In essence a CCD is a collection of CCD cells. The CCD circuit may include multiple layers of capacitors (e.g., Stages) for transporting the analog signal to an array of flip-flops for storing the data controlled by a clock signal. Therefore, when light is received by a CCD sensor, the CCD sensor acquires an electrical charge according to how much light has hit the particular CCD cell, wherein each CCD cell can transfer its charge to its neighboring cell and then to external circuitry. An analog-to-digital converter may be employed to read the charge as an integer on a range.

In a CMOS sensor, each pixel has neighboring transistors that locally perform the analog to digital conversion. In one embodiment, each pixel may be an Active Pixel Sensor (APS). Imaging logic is integrated on the CMOS sensor itself, replacing the need for additional circuitry required by CCD sensors to perform the analog-to-digital conversion. Thus, power consumption for operating the CMOS sensor can be reduced. While design of CMOS sensors may be more expensive than CCD sensors due to the integrated circuitry, CMOS sensors can be inexpensively manufactured on any standard silicon production line. One drawback of CMOS sensors is that they are noisier than CCD sensors due to the additional circuitry integrated on the sensor.

In some embodiments, the processor 22 can obtain short- and long-exposure images spatially utilizing a split-sub pixel imaging chip incorporating a short exposure sub-pixel (S) and a long exposure sub-pixel (L) for each pixel. The split-sub pixel imaging chip enables the short-exposure image and the long-exposure image to be obtained simultaneously. In other embodiments, the processor 22 can obtain short- and long-exposure images temporally utilizing an imaging chip having an array of pixels each adjustable between one of a short exposure time (S) and a long exposure time (L) at a time. Thus, when temporally obtaining the short- and long-exposure images utilizing the imaging chip having the array of pixels, each pixel can be adjusted between obtaining short- and long-exposure images for given time periods. It will be understood that a transmission having a higher magnitude of light enters the long exposure pixels or sub-pixels (L) than that of the short-exposure pixels or sub-pixels (S) due to the long-exposure image having a longer shutter time (or a larger region) to increase the accumulation of light entering each pixel. Generally, short-exposure pixels or sub-pixels (S) enhance color fidelity and acquire higher resolution in a captured image during day-time driving conditions. Whereas long-exposure pixels or sub-pixels (L) increase image sensitivity by increasing the accumulation of light entering the respective pixel or sub-pixel, and thus, can be employed to increase a dynamic range of a captured image. Thus, the resulting HDR image is generated based on the obtained short-exposure image and the obtained long-exposure image.

Figure 5:
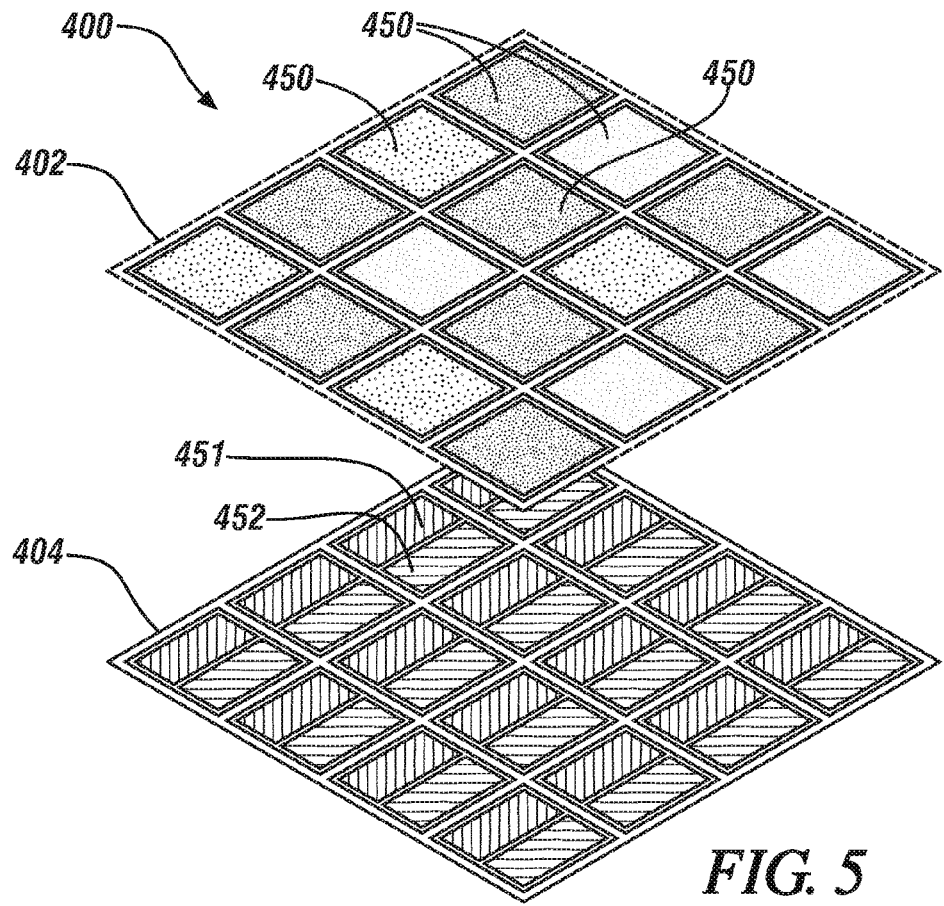
FIG. 5 illustrates an exemplary embodiment of a split sub-pixel imaging chip, in accordance with the present disclosure.

Referring to FIG. 5, an exemplary embodiment of a split sub-pixel imaging chip 400 is illustrated, in accordance with the present disclosure. The split sub-pixel imaging chip 400 includes a color filter portion 402 and a circuit portion 404. While not separately distinct, the color filtering portion 402 and circuit portion 404 are separated for purposes of illustration only to describe the exemplary embodiments described herein. Pixels 450 include green (Gr and Gb), blue (B) and red (R) pixels, each having a respective response to light due to different color filters. Referring to the circuit portion 404, each pixel 450 is a split sub-pixel including a short exposure sub-pixel (S) 451 and a long-exposure sub-pixel (L) 452. In a non-limiting embodiment, each sub-pixel 451 and 452 is 3 μm×6 μm. Utilizing the split sub-pixel imaging chip 400, the processor 22 can spatially obtain short- and long-exposure images simultaneously.

Figure 6:
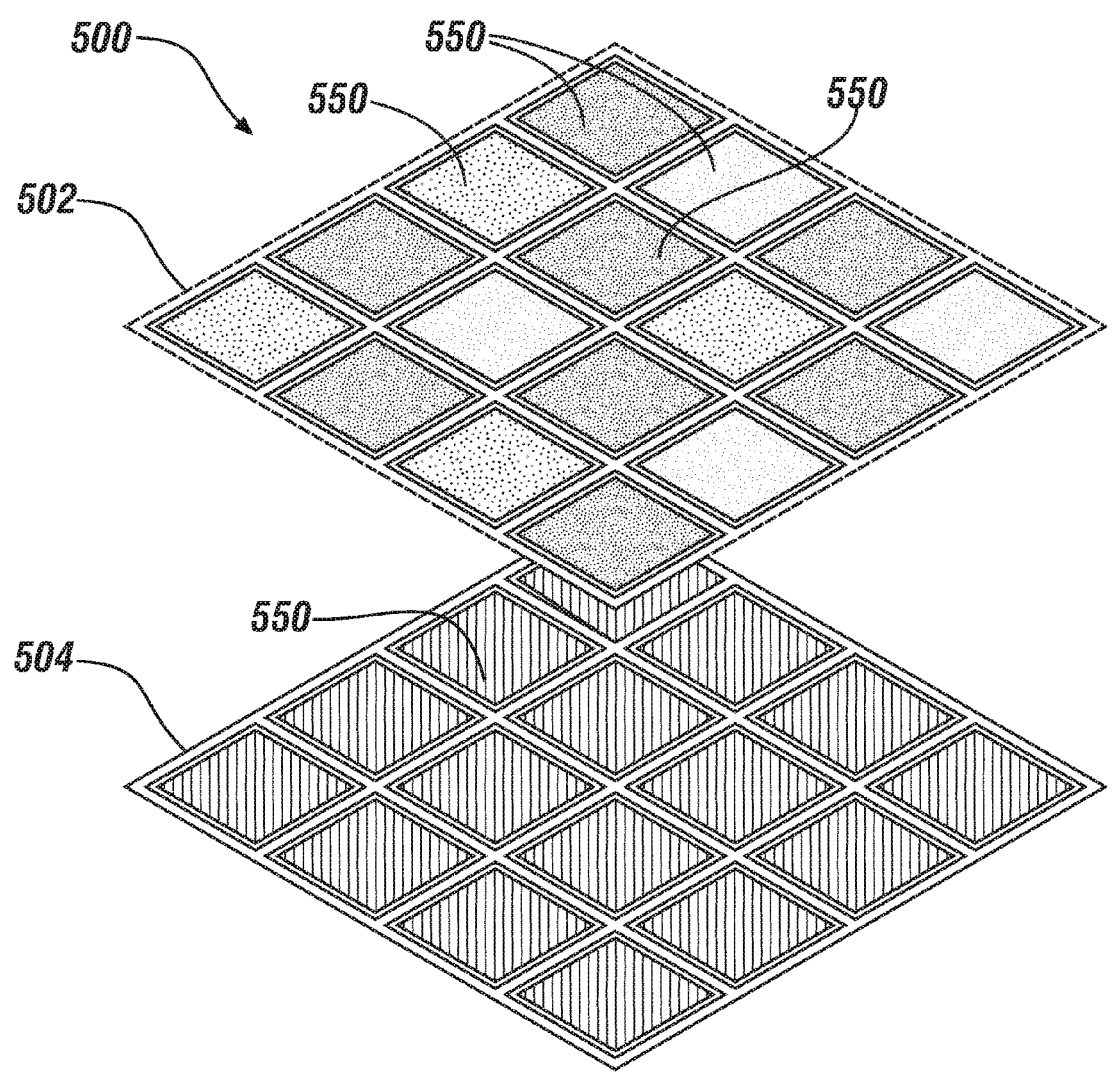
FIG. 6 illustrates an exemplary embodiment of an imaging chip having an array of pixels adjustable between one of short- and long-exposure times at a time, in accordance with the present disclosure.

Referring to FIG. 6, an exemplary embodiment of an imaging chip 500 including an array of pixels 550 is illustrated, in accordance with the present disclosure. The imaging chip 500 includes a color filter portion 502 and the circuit portion 504. While not separately distinct, the color filtering portion 502 and the circuit portion 504 are separated for purposes of illustration only to describe the exemplary embodiments described herein. Pixels 550 include green (Gr and Gb), blue (B) and red (R) pixels, each having a respective response to light due to different color filters. Referring to the circuit portion 504, each pixel 550 is capable of being adjusted between one of a short-exposure time and a long-exposure time at a time. Utilizing the imaging chip 500, the processor 22 can temporally obtain short- and long-exposures for given time periods. For instance, each pixel 550 may include a short-exposure time during a first time period to obtain a short-exposure image and then each pixel 550 may be adjusted to include a long exposure time during a second time period to obtain a long-exposure image.

Figure 7:
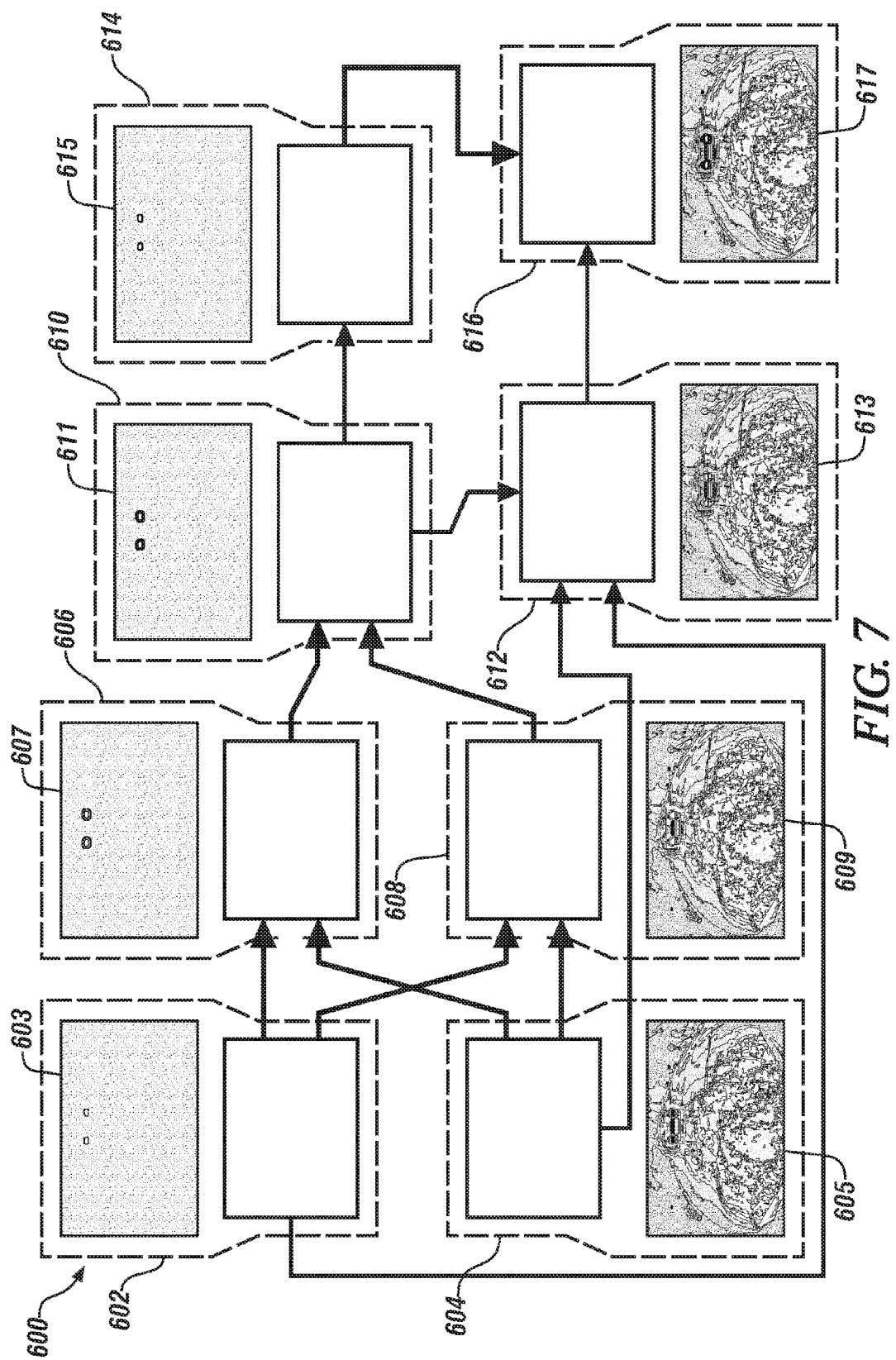
FIG. 7 illustrates an exemplary flowchart for generating a glare-reduced image, in accordance with the present disclosure.

FIG. 7 illustrates an exemplary flowchart for generating a glare-reduced image, in accordance with the present disclosure. The exemplary flowchart 600 can be executed by, and implemented within, the processor 22 (i.e., non-transitory processing device) illustrated in FIG. 1. Table 1 is provided as a key to FIG. 7 wherein the numerically labeled blocks and the corresponding functions are set forth as follows.

TABLE 1

| BLOCK | BLOCK CONTENTS |
|---|---|
| 602 | Obtaining a short-exposure image. |
| 604 | Obtaining a long-exposure image. |
| 606 | Identifying a light source region within both of the short-exposure and the long-exposure images based on monitored pixel values. |
| 608 | Calculating pixel ratios between the monitored pixel values of the long-exposure and the short-exposure images. |
| 610 | Identifying a glaring region based on the identified light source region and the pixel ratios. |
| 612 | Obtaining optimal image quality in all other regions within the short- and long-exposure images not indicative of the identified light source region. |
| 614 | Modifying the glaring region upon a resulting HDR image with a short-exposure region corresponding to the identified light source region in the short-exposure image |
| 616 | Generate a glare-reduced image based on the modified identified glaring region upon the resulting HDR image. |

Referring to block 602, a short-exposure image 603 is obtained and provided to blocks 606, 608 and 612. In the illustrated embodiment, the short-exposure image 603 corresponds to the short-exposure image 100 illustrated in FIG. 2 and captured by the rear-view camera device 16 illustrated in FIG. 1. At block 604, a long-exposure image 605 is obtained and provided to blocks 606, 608 and 612. In the illustrated embodiment, the long-exposure image 605 corresponds to the long-exposure image 200 illustrated in FIG. 3 and captured by the rear-view camera device 16 illustrated in FIG. 1. Moreover, the short- and long-exposure images obtained by the processor 22 are captured by the camera device during one of low-light and night time ambient driving conditions.

In one embodiment, the short-exposure and the long-exposure images 603, 605, respectively, are simultaneously obtained when the camera device utilizes a split sub-pixel imaging chip incorporating a short-exposure sub-pixel and a long-exposure sub-pixel for each pixel. In another embodiment, the short-exposure and the long-exposure images 603, 605, respectively, are obtained during different time periods when the camera device utilizes an imaging chip having an array of pixels each adjustable between one of a short-exposure time and a long-exposure time at a time. An HDR image is generated based on the short-exposure and long-exposure images 603, 605, respectively.

Referring to block 606, a light source region is identified within both of the short-exposure and the long-exposure images based on monitored pixel values. An identified light source image 607 including two identified light source regions, e.g., a pair of headlights of a traveling vehicle, is depicted for illustrative purposes only. Thus, the illustrated example includes direct light sources from headlights of the traveling vehicle; however, the identified light source region(s) can include a reflected light source from a roadway surface or traffic infrastructure sign. At block 606, pixel values are monitored within both the short- and long-exposure images 603, 605, respectively. The monitored pixel values are then compared to a light source threshold. The light source regions, e.g., a first region corresponding to one of the pair of headlights and a second region corresponding to the other one of the pair of headlights, are identified in both the short- and long-exposure images as corresponding to regions wherein the monitored pixel values exceed a light source threshold. In one embodiment, the light source threshold can include a minimum intensity value that is indicative of a light source and each pixel value can include an intensity value. For example, monitored pixel values including a high intensity value can be detected as saturated regions. The identified light source regions within both the short- and long-exposure images is provided to block 610.

Referring to block 608, pixel ratios (e.g., pixel intensity ratios) between the monitored pixel values of the long-exposure and the short-exposure images are calculated. A pixel ratio image 609 is depicted for illustration. The calculated pixel ratios are provided to block 610. Block 608 may additionally, or alternatively, calculate pixel intensity differences between the monitored pixel values of the long-exposure and the short-exposure images.

Referring to block 610, a glaring region is identified based on the identified light source region within both the short- and long-exposure images and the pixel ratios between the short- and long-exposure images. An identified glaring region image 611 is depicted for illustration. At block 610, the calculated pixel ratios are compared to a glaring threshold. In one embodiment, the calculated pixel ratios are indicative of intensity ratios and the glaring threshold corresponds to a minimum ratio indicative of having the aforementioned glaring effect. It will be appreciated that within a surrounding region of a detected light source region that high pixel values in the long-exposure image and low pixel values in the short-exposure image are indicative of the glaring effect. Accordingly, the glaring region can be identified as corresponding to a region around a perimeter of the identified light source where the calculated pixel ratios exceed the glaring threshold. In the illustrated embodiment, two glaring regions are identified as corresponding to respective ones of the pair of headlights of the travelling vehicle. The identified glaring region(s) is provided to blocks 612 and 614. Additionally, or alternatively, the glaring region may identified based on the identified light source region within both the short- and long-exposure images and the pixel differences between the short- and long-exposure images exceeding a glaring threshold.

Referring to block 612, other regions within the short- and long-exposure images not indicative of light source regions, include applying HDR processing to obtain optimal image quality for HDR imaging, e.g., the resulting HDR image. As described above, the resulting HDR image is generated based on the obtained short-exposure and long-exposure images of blocks 602, 604, respectively. For instance, long-exposure times can be utilized to preserve details of dark regions and short-exposure times can be utilized to preserve details of bright regions (e.g., dynamic range of bright) from saturation. The long-exposure time and the short-exposure time can be combined to generate the resulting HDR image with extended HDR to show the details of both dark and bright regions that are not indicative of light source regions. HDR processing of block 612 may include at least one of applied tone mapping, adjusted exposure time, gamma correction and pixel bit-depth conversion to obtain optimal image quality within these other regions. In the illustrated non-limiting embodiment, image 613 includes the obtained optimal image quality for other regions of the resulting HDR image. Thereafter, the other regions of optimal image quality that are not indicative of the identified light source region(s) are provided to block 616.

Referring to block 614, glaring region enhancement is performed. Glaring region enhancement includes reducing the glaring effect from the identified glaring region(s) identified at block 610. Reducing the glaring effect in the glaring region includes modifying the glaring region upon the resulting HDR image with a short-exposure region corresponding to the identified light source region in the short-exposure image. It will be appreciated that when the glaring region is present upon the resulting HDR image, the short-exposure region and the long-exposure region may be applied thereto in equal portions. For instance, the glaring region upon the resulting HDR image may include half of the identified light source region in the short-exposure image and half of the identified light source region in the long-exposure image. In the illustrated non-limiting embodiment, modifying the glaring region of respective ones of the pair of headlights includes replacing the glaring region with respective ones of the identified light source regions in the short-exposure image. However, other embodiments of modifying the glaring region can include increasing the portion of the identified light source regions in the short-exposure image, while decreasing the portion of the identified light source regions in the long-exposure image. In other words, the identified light source regions in the long-exposure image may contribute some portion that is less than that of the identified light source regions in the short-exposure image. An enhanced glaring region image 615 including the glaring region modified through replacement with the short-exposure region corresponding to the identified light source region in the short-exposure image is depicted for illustration. The enhanced glaring region image 615 is provided to block 616.

It will be appreciated that simply replacing the glaring regions upon the resulting HDR image with the short-exposure region can produce an undesirable "intensity jump." Therefore, the glaring region of respective ones of the pair of headlights can be modified by varying the contribution of the portion of the short-exposure region applied to the glaring region. For instance, centers of the glaring regions can include an increased contribution of the portion of the short-exposure region compared to the long-exposure region, wherein the contribution of the portion of the short-exposure region gradually decreases toward the periphery of the identified glaring regions. In a non-limiting example, a center of an identified glaring region may include a 95 percent portion of the short-exposure region and a 5 percent portion of the long-exposure region, whereas the periphery of the identified glaring region may include an equal contribution from each of the short- and long-exposure regions.

At block 616, a glare-reduced image 617 is generated based on the modified identified glaring region upon the resulting HDR image. In the illustrated embodiment, the glare-reduced image 617 corresponds to the glare-reduced image 300 of FIG. 4. The glare-reduced image 617 includes the replaced glaring region with the short-exposure region of block 614 and the HDR processing applied to regions not indicative of the glaring region of block 612 to obtain optimal image quality.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for generating a glare-reduced image from images captured by a camera device of a subject vehicle, comprising:
    obtaining a short-exposure image and a long-exposure image captured by the camera device;
    generating a resulting high dynamic range (HDR) image based on the short-exposure and long-exposure images;
    monitoring pixel values within both the short-exposure and the long-exposure images;
    identifying a light source region within both the short-exposure and the long-exposure images based on the monitored pixel values;
    calculating one of pixel ratios and pixel differences between the monitored pixel values of the long-exposure and the short-exposure images;
    identifying a glaring region based on the identified light source region within both the short-exposure and the long-exposure images and one of calculated pixel ratios and calculated pixel differences;
    modifying the identified glaring region upon the resulting HDR image with a short-exposure region corresponding to the identified light source region within the unmodified short-exposure image, comprising increasing the portion of the unmodified identified light source region within the short-exposure image and decreasing the portion of the identified light source region within the long-exposure image applied thereto; and
    generating a glare-reduced image based on the modified identified glaring region upon the resulting HDR image.

2. The method of claim 1, wherein the short-exposure and the long-exposure images are simultaneously obtained when the camera device utilizes a split sub-pixel imaging chip incorporating a short-exposure sub-pixel and a long-exposure sub-pixel for each pixel.

3. The method of claim 1, wherein the short-exposure and the long-exposure images are obtained during different time periods when the camera device utilizes an imaging chip having an array of pixels each adjustable between one of a short-exposure time and a long-exposure time at a time.

4. The method of claim 3, wherein obtaining the short-exposure and long-exposure images comprises:
    for each pixel, utilizing the short-exposure time during a first time period to obtain the short-exposure image and utilizing the long-exposure time during a second time period to obtain the long-exposure image.

5. The method of claim 1, wherein identifying the light source region within both the short-exposure and the long-exposure images comprises:
    comparing the monitored pixel values to a light source threshold; and
    identifying the light source region within both the short-exposure and the long-exposure images corresponding to a region wherein the monitored pixel values exceed the light source threshold.

6. The method of claim 1, wherein the monitored pixel values comprise at least an intensity value for each pixel within both the short-exposure and the long-exposure images.

7. The method of claim 6, wherein the monitored pixel values further comprise color information for each pixel within both the short-exposure and the long-exposure images.

8. The method of claim 1, wherein identifying the glaring region comprises:
    comparing calculated pixel ratios to a glaring threshold;
    identifying the glaring region corresponding to a region around a perimeter of the identified light source where calculated pixel ratios exceed the glaring threshold.

9. The method of claim 1, wherein identifying the glaring region comprises:
    comparing calculated pixel differences to a glaring threshold;
    identifying the glaring region corresponding to a region around a perimeter of the identified light source where calculated pixel differences exceed the glaring threshold.

10. The method of claim 1, wherein generating the glare-reduced image further comprises:
    in all other regions not identified as the glaring region, applying HDR processing for enhancing image quality for the resulting HDR image.

11. The method of claim 10, wherein applying HDR processing includes at least one of applied tone mapping, adjusted exposure time, gamma correction and pixel bit-depth conversion.

12. The method of claim 1, wherein modifying the identified glaring region upon the resulting HDR image comprises:
    modifying the identified glaring region to include a portion of the identified light source region within the short-exposure image that is greater than a portion of the identified light source region within the long-exposure region.

13. The method of claim 12, wherein the portion of the identified light source region within the short-exposure image gradually decreases from a center of the identified glaring region to a periphery of the identified glaring region.

14. Method for generating a glare-reduced image from images captured by a camera device of a subject vehicle, comprising:
    obtaining a short-exposure image and a long-exposure image captured by the camera device;
    generating a resulting high dynamic range (HDR) image based on the obtained short-exposure and long-exposure images;

monitoring pixel values within both the short-exposure and the long-exposure images, each pixel value comprising at least an intensity value;

identifying a light source region within both the short-exposure and the long-exposure images based on the monitored pixel values;

identifying a glaring region around a perimeter of the identified light source based on the identified light source region within both the short-exposure and the long-exposure images and the calculated pixel ratios between the monitored pixel values of the long-exposure and the short-exposure images;

modifying the identified glaring region upon the resulting HDR image with a short-exposure region corresponding to the respective identified light source region within the unmodified short-exposure image, comprising increasing the portion of the unmodified identified light source region within the short-exposure image and decreasing the portion of the identified light source region within the long-exposure image applied thereto;

applying HDR processing for obtaining optimal image quality for the resulting HDR image in all other regions not identified as the glaring region; and generating a glare-reduced image based on the modified identified glaring region upon the resulting HDR image.

15. The method of claim 14, wherein the identified light source region includes one of a direct light source region and a reflective light source region.

16. The method of claim 14, wherein obtaining the short-exposure and the long-exposure images comprises one of:
spatially obtaining the short-exposure and the long-exposure images simultaneously when the camera device utilizes a split sub-pixel imaging chip incorporating a short-exposure sub-pixel and a long-exposure sub-pixel for each pixel; and
temporally obtaining the short-exposure and the long-exposure images during different time periods when the camera device utilizes an imaging chip having an array of pixels each adjustable between one of a short-exposure time and a long-exposure time at a time.

17. The method of claim 14, wherein identifying the light source region within both the short-exposure and the long-exposure images based on the monitored pixel values comprises:
comparing the monitored pixel values to a light source threshold, the light source threshold comprising a minimum intensity indicative of a light source;
identifying the light source region within both the short-exposure and the long-exposure images corresponding to a region wherein the monitored pixel values exceed the light source threshold.

18. The method of claim 14, wherein identifying the glaring region around the perimeter of the identified light source comprises:
comparing calculated pixel ratios to a glaring threshold, the glaring threshold comprising a minimum intensity value indicative of a glaring effect; and
identifying the glaring region corresponding to the region around the perimeter of the identified light source where calculated pixel ratios exceed the glaring threshold.

19. The method of claim 14, wherein the camera device comprises a rear-view camera device for capturing a field of view rearward of the subject vehicle.

20. An apparatus for generating a glare-reduced image from images captured by a camera device of a subject vehicle, comprising:
the camera device capturing a field of view projecting away from the subject vehicle; and
a processing device configured to:
obtain a short-exposure image and a long-exposure image captured by the camera device,
generate a resulting high dynamic range (HDR) image based on the obtained short-exposure and long-exposure images,
monitor pixel values within both the short-exposure and the long-exposure images, identify a light source region within both the short-exposure and the long-exposure images based on the monitored pixel values,
calculate pixel ratios between the monitored pixel values of the long-exposure and the short-exposure images,
identify a glaring region based on the identified light source region within both the short-exposure and the long-exposure images and the calculated pixel ratios,
modify the identified glaring region upon the resulting HDR image with a short-exposure region corresponding to the identified light source region within the unmodified short-exposure image, comprising increasing the portion of the unmodified identified light source region within the short-exposure image and decreasing the portion of the identified light source region within the long-exposure image applied thereto, and
generate a glare-reduced image based on the modified identified glaring region upon the resulting HDR image.

* * * * *